United States Patent
Robak

[15] 3,704,054
[45] Nov. 28, 1972

[54] FOLDING MIRROR AND SCREEN ASSEMBLY

[72] Inventor: Edward Robak, Orange, Calif.

[73] Assignee: Technicolor, Inc., Hollywood, Calif.

[22] Filed: May 14, 1971

[21] Appl. No.: 143,446

[52] U.S. Cl. ............... 350/123, 350/124, 352/104, 353/75, 353/77
[51] Int. Cl. .............................................. G03b 21/56
[58] Field of Search ........ 350/123, 124, 117; 353/72, 353/74, 75, 77, 79; 352/34, 104

[56] References Cited

UNITED STATES PATENTS

| 3,522,982 | 8/1970 | Hughes | 350/123 |
| 2,268,104 | 12/1941 | Bentley | 353/72 X |
| 3,479,116 | 11/1969 | Anderson | 353/77 |
| 3,375,054 | 3/1968 | Hughes | 352/29 |

Primary Examiner—Samuel S. Matthews
Assistant Examiner—Richard L. Moses
Attorney—Lyon & Lyon

[57] ABSTRACT

A folding mirror and screen assembly for use with projectors, viewers, or the like is disclosed which includes a mirror unit and screen pivotally mounted on a base means and a support arm pivotally connected to the mirror unit. Latch means are provided on the base means to latch the support arm in upright position when the assembly is in its viewing position. Means are also included to release the latch means so that the assembly may be folded into the closed position.

14 Claims, 6 Drawing Figures

INVENTOR
EDWARD ROBAK
BY
Lyon & Lyon
ATTORNEYS

INVENTOR
EDWARD ROBAK
BY
Lyon & Lyon
ATTORNEYS

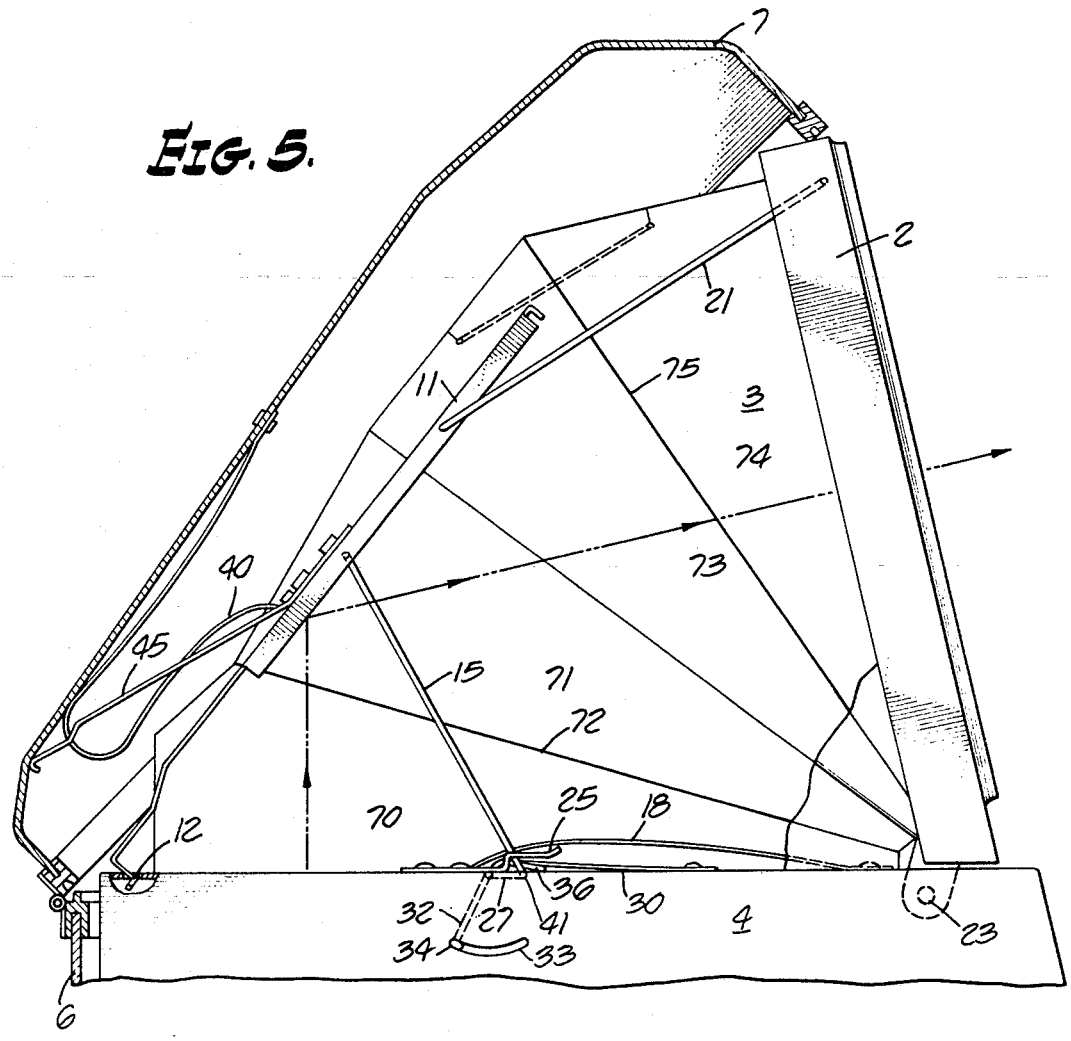
FIG. 5.
FIG. 6.
INVENTOR
EDWARD ROBAK
BY
ATTORNEYS

FOLDING MIRROR AND SCREEN ASSEMBLY

BACKGROUND OF THE INVENTION

This invention relates as indicated to a folding mirror and screen assembly of the type used with projectors, viewers or other apparatus for projecting and displaying images on a viewing surface.

In recent years, the use of projection apparatus in instructional situations, as for example, in class rooms, lecture rooms, exhibition rooms, etc., has become quite popular. This is especially true since the introduction of self-contained projection units, that is, units containing within a single housing the projection, optical and screen mechanisms. In such self-contained units, the image is normally projected via a plurality of reflecting mirrors to a translucent screen which is also positioned within the unit.

To achieve maximum utility with the projection apparatus, it is desirable to have a compact and portable unit. To provide this, it has been proposed, as in the application of Hans Graafman, filed concurrently herewith, entitled "Remote Focusing Assembly," to retain the projection apparatus within the lower portion of the case in which the projector or viewer is contained with the screen positioned thereabove. The screen may thus be raised when the apparatus is used and readily retracted when the projector is not in use. To provide such an arrangement of apparatus, however, it is necessary to provide means for raising and folding the screen to insure convenient and consistent performance.

SUMMARY OF THE INVENTION AND DESCRIPTION OF PREFERRED EMBODIMENTS

A folding mirror and screen assembly is provided in which a mirror unit is pivotally mounted on a base means and pivotally connected to a screen which is also pivotally mounted on the base means. A support arm is pivotally connected to the mirror unit to support the mirror unit and screen and latch means are provided to latch the support arm in its upright position when the assembly is in the viewing position. Means are also included to release the latch means and permit the assembly to be folded into the closed position. A left and right segmented collapsible light shield is also provided to block light reflections during viewing.

The invention will be better understood by referring to the annexed drawings in which:

FIG. 5 is a side view illustrating the assembly in the viewing position; and

FIG. 6 is a detail view of the release and latch mechanisms.

Figure 1:
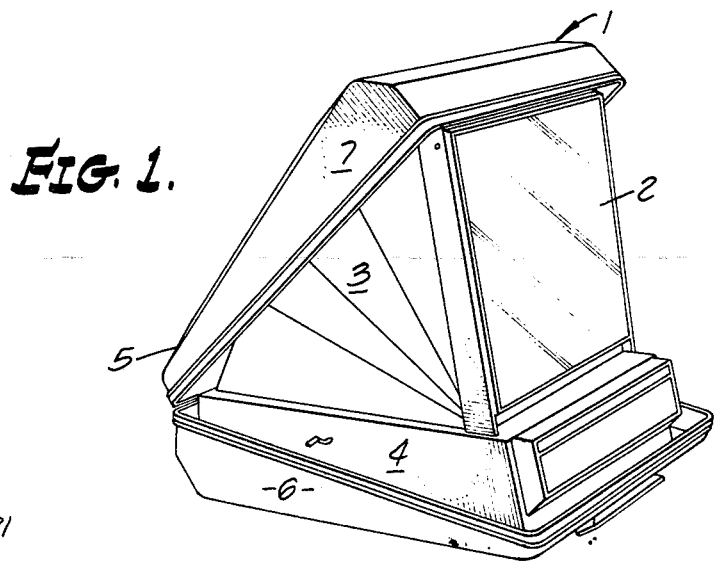
FIG. 1 is a perspective view showing the assembly in the viewing position.

Referring now more particularly to FIG. 1, the mirror and screen assembly designated generally by numeral 1 is shown in the extended or viewing position. The assembly thus includes a screen 2 in a generally upright position at the forward end of the assembly. Light shields 3 are provided on the two sides of the assembly connected to the screen and base means 4. The assembly is retained within a case 5 comprising a bottom portion 6 and a lid section 7.

Figure 2:
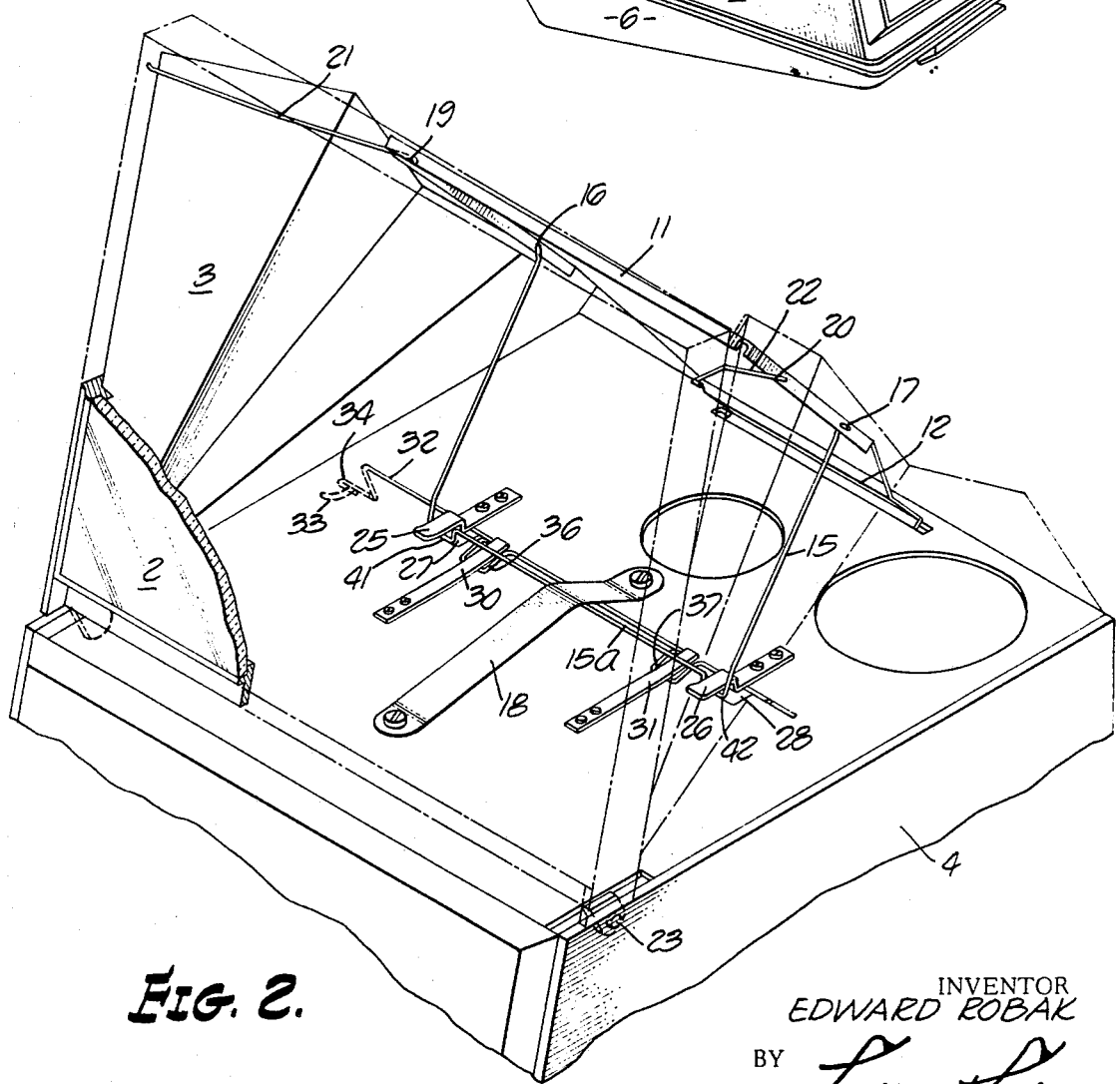
FIG. 2 is a perspective view of the mirror and screen assembly with the screen partially removed for clarity of illustration.
Figure 4:
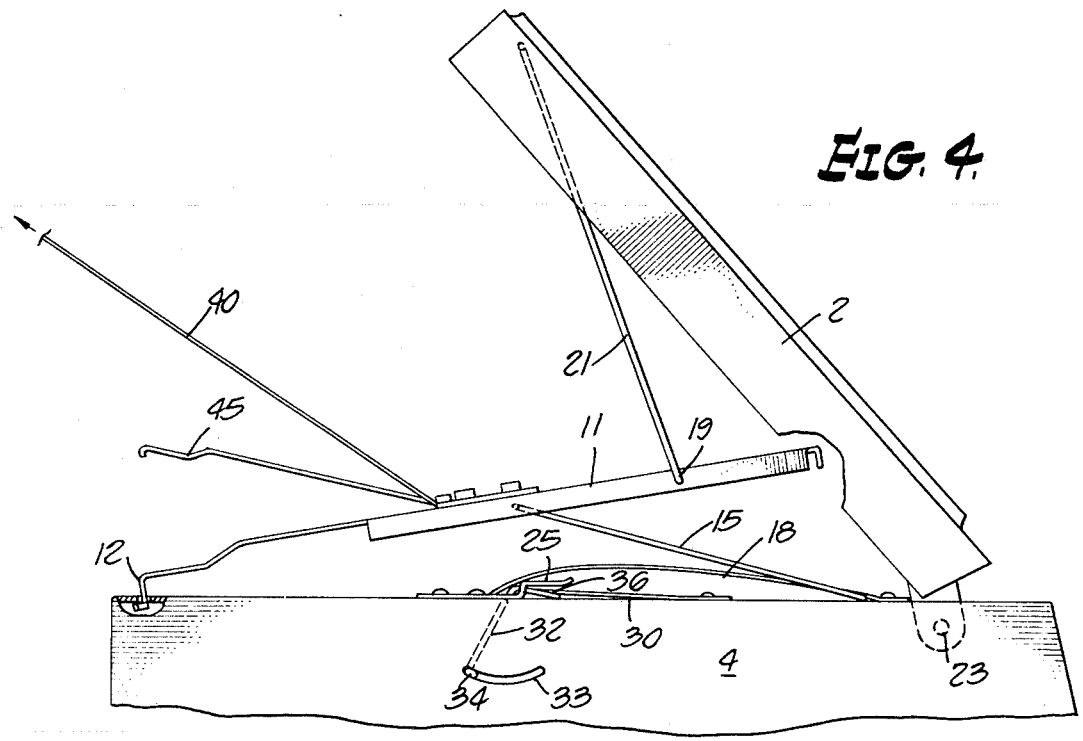
FIG. 4 is a side view illustrating the mirror and screen assembly being opened.

Referring now to FIGS. 2-5, the mirror and screen assembly, includes base means 4, which is a cover plate for the projection mechanism as will be described more fully, mounted within the bottom section 6 of the case. A mirror unit 11 is pivotally connected to the base means as shown at 12 as to pivot from a flat position adjacent the surface of the base means when the assembly is in its folded closed position to an upright position as shown in FIGS. 2 and 5 when the assembly is in the viewing position. A support arm 15 is pivotally mounted on the mirror unit at 16 and 17 and is in operative contact with the base means through horizontally extending portion 15a. A strap 18 overlies portion 15a of the support arm to limit movement of the same, as will be more completely described.

The screen 2 is pivotally connected to the mirror unit at 19 and 20 by rods 21 and 22 which extend between the screen frame and the mirror unit. The screen is pivotally connected to the base means at the forward portion of the assembly as shown at 23.

The base means includes a latch mechanism to latch the support arm in upright position when the assembly is in its viewing position as shown in FIGS. 1, 2 and 5. The latch means include stop means in the form of prong-shaped members 25 and 26 which are mounted on the upper surface of the base means and prevent over-travel of the support arm when the mirror and screen assembly is opened and raised to the upright, viewing position. The latch mechanism also includes recesses 27 and 28 in the base means in which the support arm fits firmly when the assembly is in the viewing position. The recesses are of greater depth adjacent the stop means, tapering gradually to a lesser depth at the front thereof, as shown in FIG. 6, to facilitate release of the support arm from the recesses.

Figure 3:
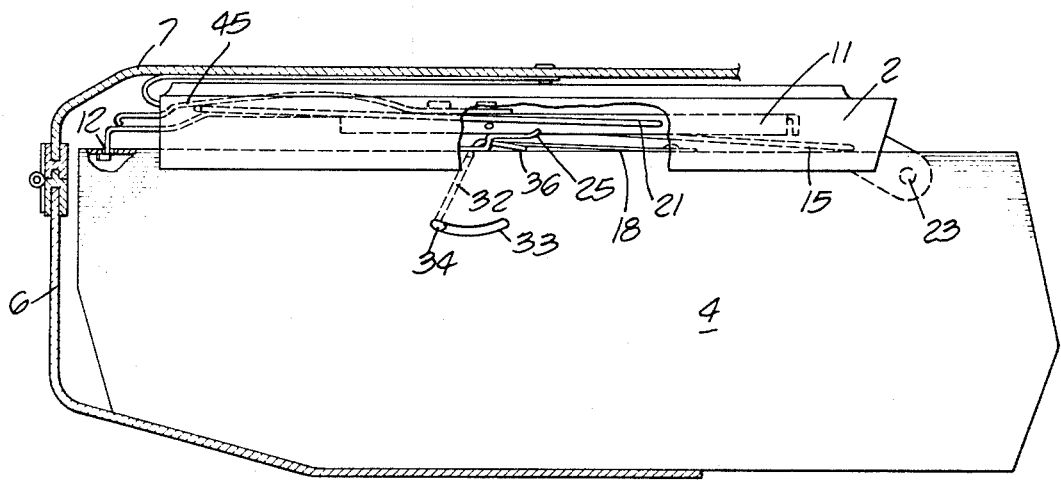
FIG. 3 is a side view partially in section showing the assembly in the folded position.

The assembly also includes means to release the latch mechanism, so that the assembly may be folded into the closed position shown in FIG. 3. The release means includes lift springs 30 and 31 which are mounted on the surface of the base means 4. The springs are in contact with the support arm 15, underlying the same as illustrated and are also in contact with a release arm 32 which is also mounted on the base means and extends across the surface therof underlying the springs. The release arm extends through the slot 33 in the base means and is connected to a handle 34. The base means has a horizontally extending groove 35 in its upper surface in which the release arm is positioned. The release arm also includes offset members 36 and 37, which are also raised somewhat (see FIG. 6), underneath the lift springs to facilitate lifting of the springs when the release arm is rotated.

A strap 40 is connected to the rear side of the mirror unit and to the interior of the case housing lid section to facilitate unfolding of the assembly. A spring 45 is also preferably included, attached to mirror 11, to facilitate proper positioning of the mirror and screen when the assembly is unfolded. Since the cover is attached directly to the mirror unit, to lift the assembly to the viewing position, it is only necessary to unlatch the case and raise the cover in the normal manner. This causes the mirror unit to be raised from its folded position and since the mirror unit is connected through the linkage arms, 21 and 22 to the screen and is also connected to the support arm 15, the screen will pivot at 23 into the upright position shown in FIGS. 1, 2, and 5. When in the viewing position, the lower edge portions 41 and 42 of the support arm 15 thus are secured underneath the stop or prong members 25 and 26 and firmly retained within the recesses 27 and 28. The stop means also prevent the support arm 15 from travelling father than intended as the arm is moved across the surface of the base means.

To release the latch mechanism and fold the assembly into the closed position, one need only move handle 34 in slot 33, which causes the release arm 32 to rotate and raise lift springs 30 and 31 by contact between offset members 36 and 37 of the release arm and the lift springs. When the springs are raised, they contact the horizontal portion 15a of the support arm and cause the edge 41 and 42 to be moved out of recesses 27 and 28 in the base means, as shown in phantom lines in FIG. 6. The assembly will then fold to the closed position naturally due to the weight of the cover and mirror unit. The strap member 18 prevents the support arm from being moved out of the proper position on the surface of the base means when the assembly is closing and also serves to guide the support arm into the proper position when the assembly is opened and raised to the viewing position.

With regard to the projection apparatus, which would be retained within the base means 4 to project the images from a film to the mirror and screen units illustrated and described herein, reference may be made to application Serial No. 143,447, filed May 14, 1971 entitled "Remote Focusing Assembly," filed concurrently herewith, in the name of Hans Graafman, and assigned to the assignee of the present application, which illustrates and describes that portion of the optical assembly which may be utilized in this invention. Accordingly, the disclosure of such application is incorporated herein by reference.

Segments 70 and 71 in FIG. 5 fold at line 72 and the fold is always slightly inclined inward. The same is true of segments 73 and 74 and fold line 75. Fold line 76 is inclined outwardly so that the four segments can fold compactly without interfering with closure of the unit.

It will thus be appreciated from the foregoing description that a compact and efficient mirror and screen assembly has been provided which is capable of achieving convenient and consistent performance in positioning accurately the mirror and screen units of the assembly for satisfactory projection of the images for viewing.

I claim:

1. A folding mirror and screen assembly for projectors and the like comprising a base means, a mirror unit pivotally mounted on said base means, a screen pivotally connected to said mirror unit and to said base means, a support arm pivotally connected to said mirror unit in operative position adjacent the surface of said base means, latch means mounted on said base means to latch said support arm in upright position when said assembly is in the viewing position, and means to release said latch means, whereby said assembly may be folded into its closed position.

2. The mirror and screen assembly of claim 1 in which said assembly is retained within a case and includes means connecting said mirror unit to the interior of the housing of said case.

3. The assembly of claim 2 in which stop means are mounted on said base means to prevent over-travel of said support arm across the surface of said base means.

4. The assembly of claim 2 in which said release means include lift springs mounted on said base means adapted to have contact with said support arm when said assembly is in the viewing position, and a release arm mounted on said base means adjacent said lift springs, whereby rotation of said release arm lifts said springs and support arm and releases said support arm from said latch means.

5. The assembly of claim 4 in which said release arm includes means to facilitate lifting said lift springs.

6. The assembly of claim 2 in which said latch means includes a recess in said base means and said support arm is retained in said recess when said assembly is in the viewing position.

7. The assembly of claim 6 in which stop means are mounted on said base means to prevent over-travel of said support arm, and said recess extends outwardly from and decreases gradually in depth from said stop means to facilitate the release of said support arm from said recess.

8. The assembly of claim 2 including a light shield enclosing said screen and mirror unit.

9. The assembly of claim 2 including means mounted on said base means overlying said support arm to limit movement of the same across the surface of said base means.

10. A folding mirror and screen assembly for projectors or the like comprising a base means, a mirror unit pivotally connected to said base means, a screen pivotally connected to said mirror assembly and to said base means, a support arm pivotally connected to said mirror unit in operative position adjacent the surface of said base means, latch means mounted on said base means to latch said support arm in the upright position when said assembly is in the viewing position, said latch means including a recess in said base means in which said support arm fits when in the upright position, means to release said latch means, whereby said assembly may be folded into a closed position, said release means including lift springs mounted on said base means adapted to be in contact with the underside of said support arm when said assembly in the viewing position and a release arm mounted on said base means adjacent said lift springs adapted for rotatable movement about the surface of said base means, whereby rotation of said release arm lifts said springs and support arm and releases said support arm from said latch means, and said mirror and screen assembly retained within a case and including means connecting said mirror unit to the interior of the housing of said case.

11. The assembly of claim 10 in which said support arm is a continuous rod pivotally connected to said mirror unit at the sides thereof with a portion substantially centrally of the length thereof adjacent the surface of said base means to provide support for said assembly.

12. The assembly of claim 11 in which said release arm includes means to facilitate lifting said lift springs.

13. The assembly of claim 11 in which said release arm includes a handle extending through said base means at one side thereof to facilitate rotation of said release arm and release of said support arm from said latch means.

14. The assembly of claim 12 in which said release arm extends across said base means and is retained in a groove in the surface of said base means.

* * * * *